United States Patent
Azadet (10) Patent No.: US 7,155,134 B2
(45) Date of Patent: Dec. 26, 2006

(54) PULSE AMPLITUDE MODULATED TRANSMISSION SCHEME FOR OPTICAL CHANNELS WITH SOFT DECISION DECODING

(75) Inventor: Kameran Azadet, Morganville, NJ (US)

(73) Assignee: Agere Systems Inc., Allentown, PA (US)

( * ) Notice: Subject to any disclaimer, the term of this patent is extended or adjusted under 35 U.S.C. 154(b) by 692 days.

(21) Appl. No.: 10/219,904

(22) Filed: Aug. 15, 2002

(65) Prior Publication Data
US 2003/0180041 A1 Sep. 25, 2003

Related U.S. Application Data (60) Provisional application No. 60/366,930, filed on Mar. 22, 2002.

(51) Int. Cl.
*H04B 10/06* (2006.01)
(52) U.S. Cl. .............. 398/202; 398/183; 398/193; 398/208; 398/209; 398/213; 398/214; 398/135; 398/140; 398/141; 375/317; 375/286; 375/287
(58) Field of Classification Search .............. 359/109; 398/202, 208, 209, 213, 214, 183, 193, 135, 398/138, 140, 141; 375/317, 286, 287
See application file for complete search history.

(56) References Cited

U.S. PATENT DOCUMENTS

| | | | | |
|---|---|---|---|---|
| 5,438,593 | A | 8/1995 | Karam et al. | 375/317 |
| 5,923,711 | A * | 7/1999 | Willming | 375/287 |
| 6,690,894 | B1 * | 2/2004 | Ho et al. | 398/183 |
| 2001/0035997 | A1 * | 11/2001 | Agazzi | 359/173 |
| 2002/0007257 | A1 | 1/2002 | Riess et al. | 703/2 |
| 2002/0167693 | A1 * | 11/2002 | Vrazel et al. | 359/109 |
| 2003/0035497 | A1 * | 2/2003 | Gorecki et al. | 375/317 |

FOREIGN PATENT DOCUMENTS

| | | |
|---|---|---|
| EP | 0 840 483 A2 | 6/1998 |
| EP | 1 292 078 A1 | 12/2003 |

\* cited by examiner

*Primary Examiner*—Hanh Phan (57) ABSTRACT

An amplitude modulated optical communication system and method are disclosed that achieve bandwidth compression by making use of an n level amplitude modulation scheme in one or more frequency bands. A soft decision decoder is disclosed that provides at least two soft slicing levels between each signal level in the multiple level transmission scheme to define an "uncertainty" region therebetween. The soft slicing levels are used to evaluate the reliability of a given bit assignment. In addition to assigning a digital value based on the received signal level, one or more soft bits are assigned indicating a "reliability" measure of the output code.

21 Claims, 5 Drawing Sheets

PULSE AMPLITUDE MODULATED TRANSMISSION SCHEME FOR OPTICAL CHANNELS WITH SOFT DECISION DECODING

CROSS REFERENCE TO RELATED APPLICATIONS

This application claims the benefit of U.S. Provisional Application No. 60/366,930, filed Mar. 22, 2002.

FIELD OF THE INVENTION

The present invention relates generally to amplitude modulated optical communication systems, and more particularly, to methods and apparatus for improving spectral efficiency in such amplitude modulated optical communication systems.

BACKGROUND OF THE INVENTION

The explosive growth of digital communications technology has resulted in an ever-increasing demand for bandwidth for communicating digital information, such as data, audio and/or video information. To keep pace with the increasing bandwidth demands, new or improved network components and technologies must constantly be developed to perform effectively at the ever-increasing data rates. In optical communication systems, however, the cost of deploying improved optical components becomes prohibitively expensive at such higher data rates. For example, it is estimated that the cost of deploying a 40 Gbps optical communication system would exceed the cost of existing 10 Gbps optical communication systems by a factor of ten. Meanwhile, the achievable throughput increases only by a factor of four.

Thus, much of the research in the area of optical communications has attempted to obtain higher throughput from existing optical technologies. A number of techniques have been proposed or suggested to increase spectral efficiency. Multi-level signaling, for example, has been used in many communication systems, such as 1000BASE-T Gigabit Ethernet, to increase spectral efficiency. The use of such multiple level transmission techniques in an optical system, however, would generally require more expensive optical components and linear lasers, in order to properly distinguish the various levels. Thus, the use of a multiple level signaling approach in optical systems is generally considered impractical. A need therefore exists for a multiple level transmission technique that can be implemented within an existing optical communication system.

SUMMARY OF THE INVENTION

Generally, an amplitude modulated optical communication system and method are disclosed that achieve bandwidth compression by making use of an n level amplitude modulation scheme in one or more frequency bands. A disclosed soft decision decoder quantizes the received signal and assigns a digital value based on the received signal level value in the multiple level transmission scheme. Generally, received signal levels are measured relative to predefined slicing levels to make a corresponding assignment of the digital value. The present invention recognizes that in the presence of noise, a given signal level may cross over the intended predefined slicing level to cause an incorrect bit assignment.

The disclosed soft decision decoder provides at least two soft slicing levels between each signal level to define an "uncertainty" region therebetween. The disclosed soft decision decoder uses the soft slicing levels to evaluate the reliability of a given bit assignment. Thus, in addition to assigning a digital value (i.e., a hard output code) based on the received signal level, the disclosed soft decision decoder also generates a soft bit indicating a "reliability" measure of the output code. When the input signal is close to the defined signal level, the output code is very likely to be accurate and the soft bit is set to "1." If, however, the input signal is in an "uncertainty" region, the output code is less reliable and the soft bit is set to "0." If more than two slicing levels are used between two signal levels, it is possible to quantify the reliability with more than one bit. The reliability information provided by the soft decision decoder can be used by a forward error correction circuit to assign a corresponding digital value to the uncertain bit.

A more complete understanding of the present invention, as well as further features and advantages of the present invention, will be obtained by reference to the following detailed description and drawings.

DETAILED DESCRIPTION

Figure 1:
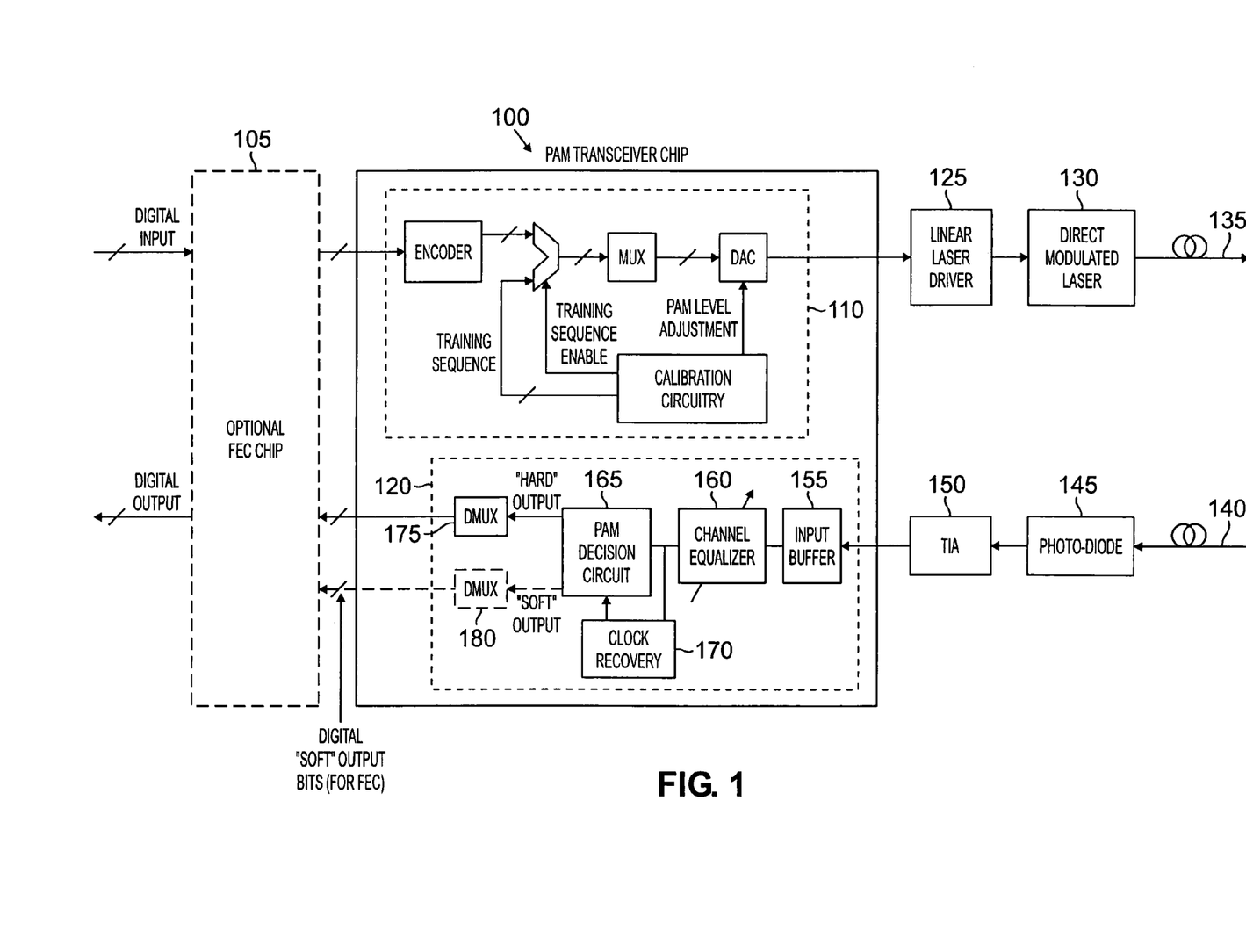
FIG. 1 illustrates an exemplary pulse amplitude modulation (PAM) transceiver incorporating features of the present invention.

FIG. 1 illustrates an exemplary pulse amplitude modulation (PAM) transceiver 100 incorporating features of the present invention. According to one aspect of the invention, the exemplary amplitude modulated communication system 100 achieves bandwidth compression by making use of an n level amplitude modulation scheme in one or more frequency bands. The multi-level signaling improves spectral efficiency by a factor of $\log_2 n$, at the expense of a higher signal-to-noise ratio (SNR) requirement. In one exemplary implementation, a PAM-4 modulation scheme is employed, thereby providing a factor-of-two (×2) bandwidth reduction (e.g., from 30 GHz for NRZ to 15 GHz). As previously indicated, the cost of 15 GHz optics is significantly less expensive and more readily available as an extension of 10 GHz optics. Relative to the 40 GHz optics that would otherwise be required to achieve the same throughput.

As shown in FIG. 1, the PAM transceiver 100 includes a transmitter section 110 and a receiver section 120. The transmitter section 110, discussed below in conjunction with FIG. 5, receives a digital input signal, that has optionally been processed by a forward error correction circuit 105, such as those based on the G.975 and G.709 standards. As discussed further below, the forward error correction circuit 105 can work in conjunction with a soft decision decoding scheme to provide improved data detection.

Generally, the transmitter section 110 encodes and multiplexes the digital input signal and converts the multiplexed signal to an analog signal with multiple levels for transmission over a fiber 135 to a remote receiver. The analog signal is used by a linear laser driver 125 to drive a laser light source 130. According to one aspect of the invention, the transmitter section 110 employs a calibration scheme to minimize the non-linear effects of the laser source 130 or the fiber channel 135 (or both).

The receiver section 120 receives an optical signal over a fiber 140 and converts the optical energy to an electrical signal using a photo-diode 145. A trans-impedance amplifier 150 converts the photo-current generated by the photo-diode 145 into a larger voltage with a magnitude suitable for the transceiver input. Thereafter, the received signal is buffered at stage 155 before an optional channel equalizer 160 equalizes the channel.

A PAM decision circuit 165 employs a novel soft decision decoding technique, discussed below in conjunction with FIG. 7, to quantize the received signal and assign a digital value based on the received signal level value in the multiple level scheme. A clock recovery circuit 170 extracts the system clock from the received signal, in a known manner. The hard and soft decision outputs generated by the PAM decision circuit 165 are demultiplexed by demultiplexers 175 and 180, respectively, before being applied to the forward error correction circuit 105, to produce the digital output.

Calibration of Optical Transmitter

Figure 2:
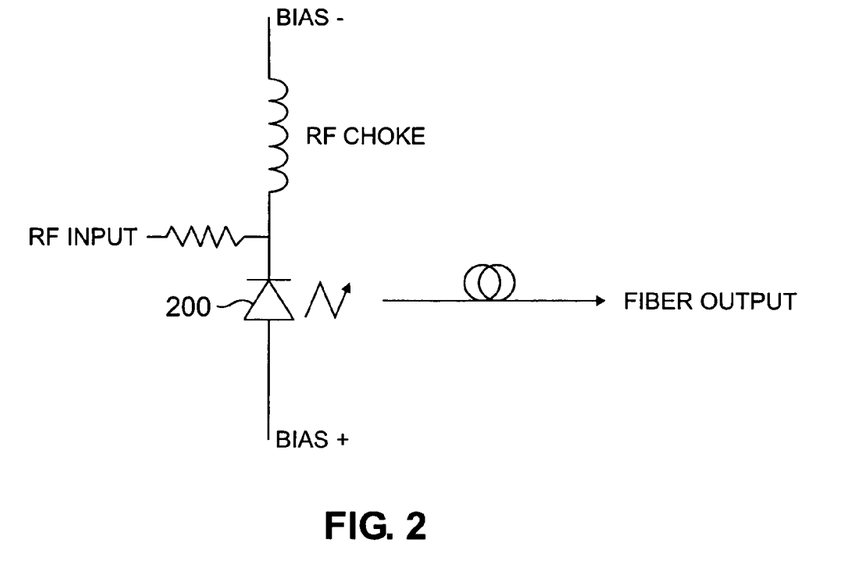
FIG. 2 illustrates a suitable optical transmitter that may be used by the transmitter section of FIG. 1.
Figure 3:
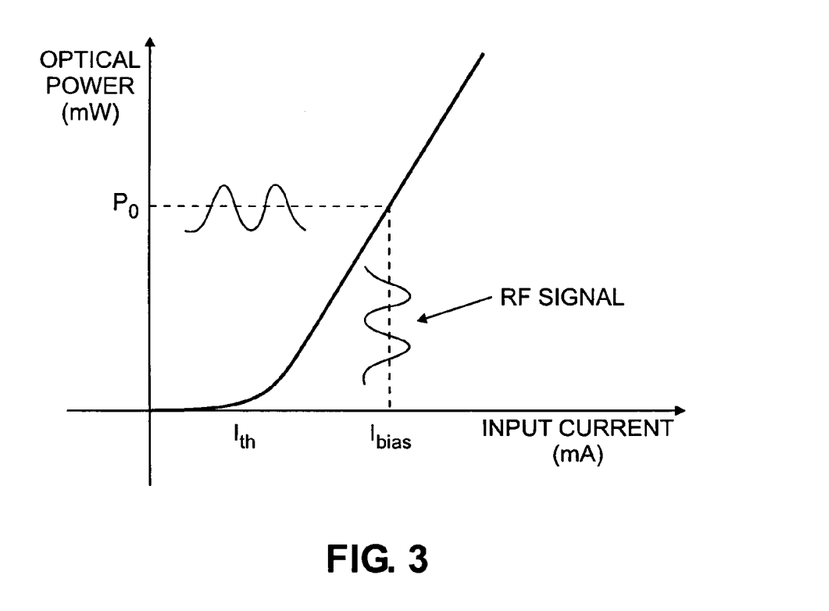
FIG. 3 illustrates the corresponding characteristics of the optical transmitter of FIG. 2.

FIG. 2 illustrates a suitable optical transmitter 200 (light source), such as a laser diode, that may be used by the transmitter section 110 of FIG. 1. The optical transmitter 200 may be embodied, for example, as a forward biased laser diode. FIG. 3 illustrates the corresponding characteristics of the optical transmitter 200 of FIG. 2. As shown in FIG. 3, the laser diode 200 will begin to generate optical power when the current through the diode exceeds a threshold current, $I_{th}$. While the optical power generated by the laser diode 200 generally has a linear relationship with the input current, for currents exceeding the threshold current, $I_{th}$, such laser diodes 200 will often exhibit non-linear effects. As previously indicated, such non-linear effects have previously made the use of multiple level signal impractical in optical systems.

Figure 4:
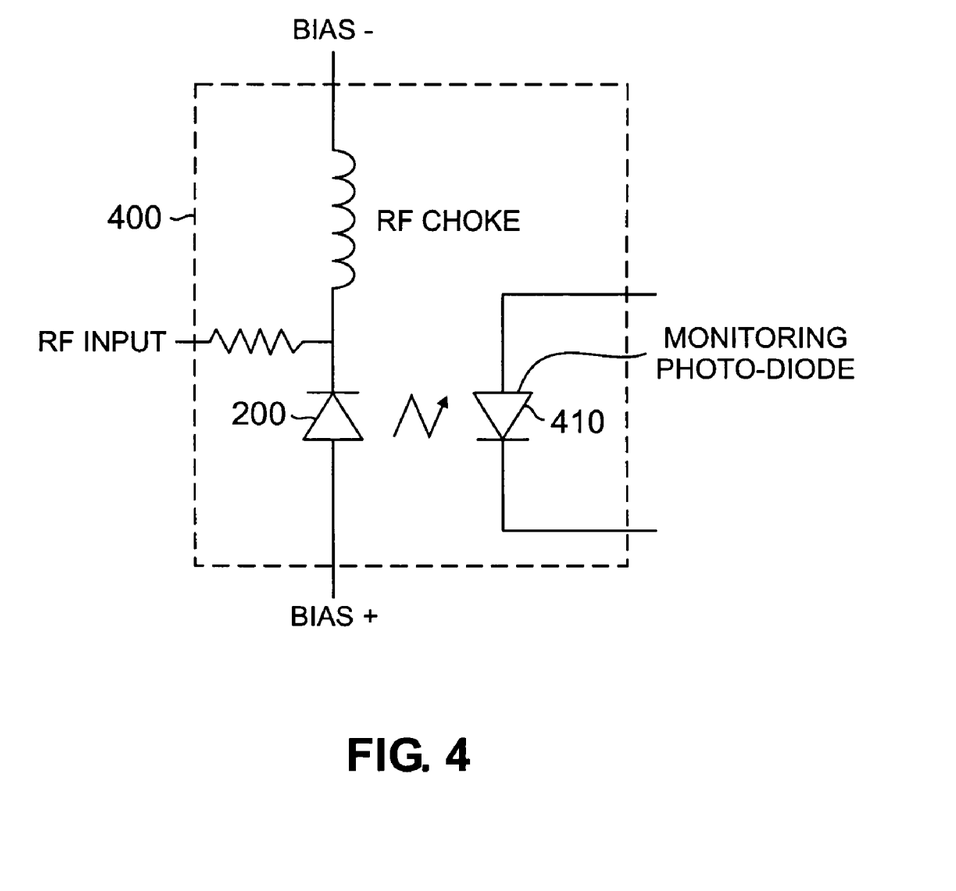
FIG. 4 illustrates a laser module incorporating features of the present invention.

Thus, the present invention proposes the use of a calibration scheme to minimize the non-linear effects of the laser source 130 or the fiber channel 135 (or both). FIG. 4 illustrates a laser module 400 incorporating features of the present invention. As shown in FIG. 4, the optical power generated by the laser source 200 is monitored in accordance with the present invention by a monitoring photo-diode 410 that can be used in a feedback configuration to adjust the level of the input signal applied to the laser source 200 and thereby compensate for the nonlinear effects. The monitoring photo-diode 410 allows the transmitted signal to be measured with a small signal bandwidth.

Figure 5:
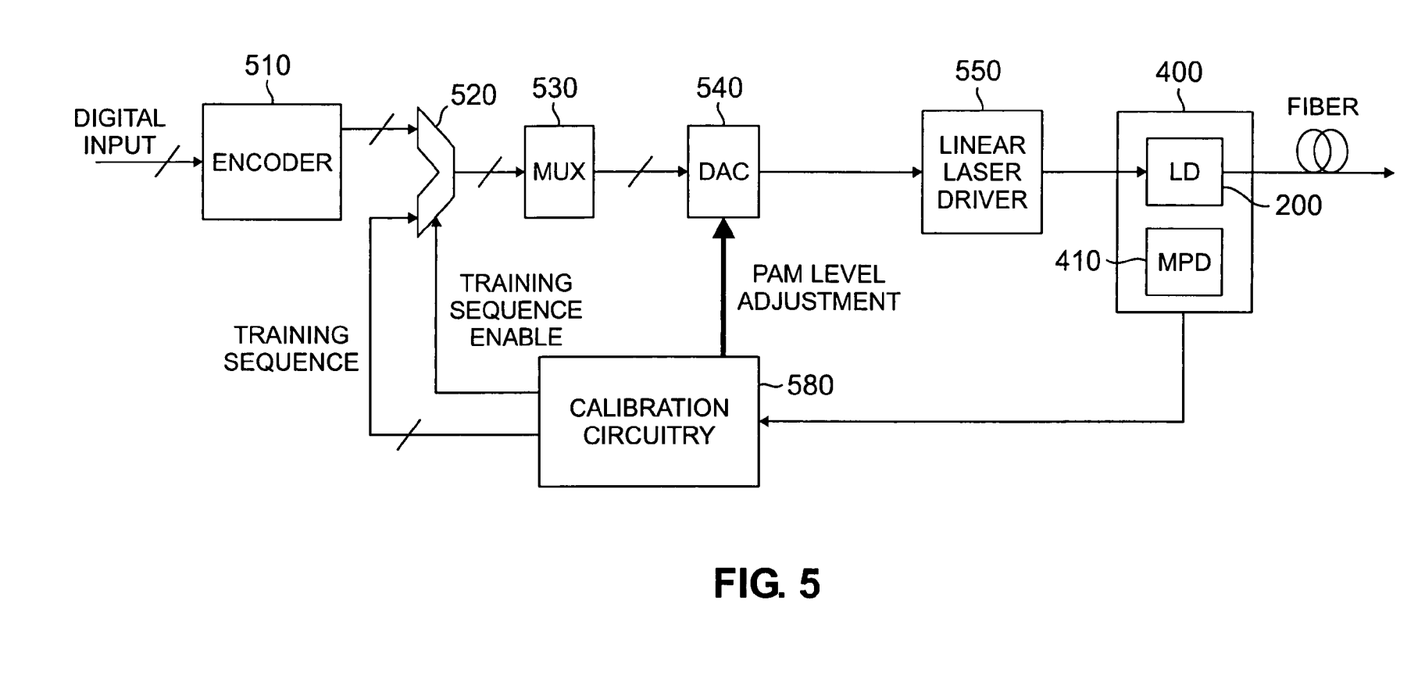
FIG. 5 is a schematic block diagram of the transmitter section of FIG. 1 in further detail.

FIG. 5 is a schematic block diagram of the transmitter section 110 of FIG. 1 in further detail. As shown in FIG. 5, the transmitter section 110 includes an encoder 510 that encodes the digital using any known encoding scheme. A switch 520 selects between the encoded data and a training sequence, as discussed further below. A multiplexer 530 multiplexes the data and a digital-to-analog converter 530 converts the digital signal to an analog signal in accordance with an exemplary PAM-4 modulation scheme, discussed below in conjunction with FIG. 6, for transmission over the fiber. The analog signal is used by a linear laser driver 550 to drive the laser diode 200 in the laser module 400.

In accordance with one aspect of the invention, the calibration circuit 180 monitors the output of the monitoring photo-diode 410 and employs a calibration scheme to minimize the non-linear effects of the laser source 130 or the fiber channel 135 (or both). Generally, the calibration circuit 180 generates a PAM level adjustment value that is applied to the digital-to-analog converter 530 to adjust the slicing levels used by the DAC 530 to generate the analog signal that is applied to the laser source 200 and thereby compensate for the non-linear effects.

As previously indicated, the calibration circuit 180 can tune-out the non-linear distribution of PAM levels caused by non-linearities in the laser source 200. The calibration circuit 180 can either observe the signal during data transmission or employ a well-known calibration sequence. During a calibration phase, the calibration circuit activates 180 a training sequence enable connection to the switch 520, thereby allowing a calibration sequence generated by the calibration circuit 180 to be selected by the multiplexer 530 and measured by the monitoring photo-diode 410. The calibration sequence can be used for calibration at the time of manufacture (i.e., on-chip trimming); at power-up; or periodically during normal transmission (assuming the protocol permits such an overhead). The calibration sequence can be a slow sequence to match the specifications of the monitoring photo-diode 410.

For example, the calibration circuit 180 can employ a threshold power level for each signal level in the multiple level transmission scheme. If a given signal level falls below the corresponding defined threshold, then the input current applied to the laser source 200 can be increased by a corresponding amount.

In a further variation, the monitoring photo-diode 410 can be positioned at the remote receiver. In other words, the detector of the receiver serves as the monitoring photo-diode 410. In this manner, calibration may take into account non-linearities in the end-to-end system (e.g., including non-linearities introduced by the channel 135) by receiving feedback information from the remote end. This end-to-end configuration can employ, for example, a start-up "handshaking" protocol.

Figure 6:
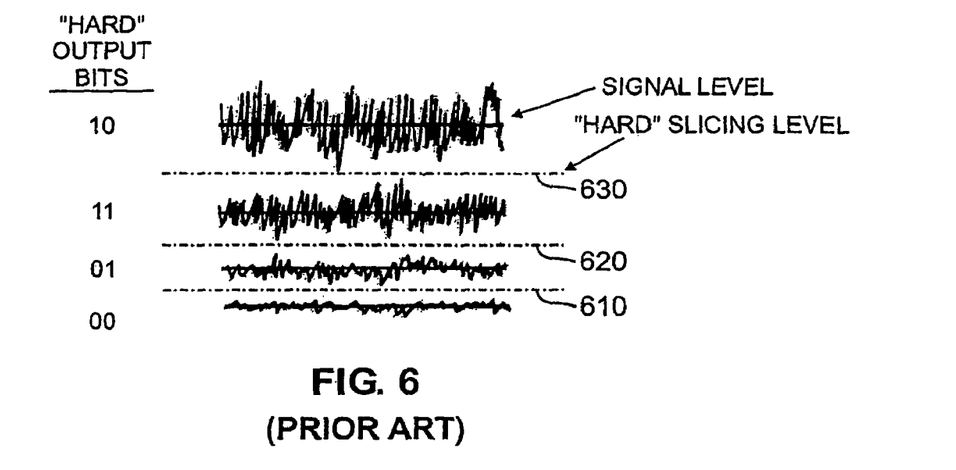
FIG. 6 illustrates a plurality of levels that may be employed in a conventional multiple-level transmission scheme.

FIG. 6 illustrates a plurality of levels 610, 620, 630 that may be employed in a multiple-level transmission scheme. In the exemplary implementation shown in FIG. 6, there are three levels 610, 620, 630, thus allowing four quantization or slicing levels. It is noted that four levels can be used to encode two bits of data. For example, a digital value of "00" is encoded with a signal level below the first slicing level 610. A digital value of "01" is encoded with a signal level between the first and second slicing levels 610, 620. A digital value of "11" is encoded with a signal level between the second and third slicing levels 620, 630. A digital value of "10" is encoded with a signal level above the third slicing level 630. As previously indicated, the present invention adjusts the precise current that is generated by the DAC 540 for each signal level to compensate for non-linearities in the laser source 200.

The present invention recognizes, however, that it may be desirable to intentionally introduce a controlled non-uniform distribution of the signal levels (as well as slicing levels of the detector) of the PAM signal to compensate for non-uniform, signal dependant noise sources, such as photodiode shot-noise, amplifier spontaneous emission (ASE) and signal beat noise, and signal distortion caused by dispersion. In other words, the present invention does not necessarily ensure a linear output of the laser source (and equal levels in the multiple level transmission scheme), but rather, compensates for any undesired non-linearities.

Soft Decision Decoding

Figure 7:
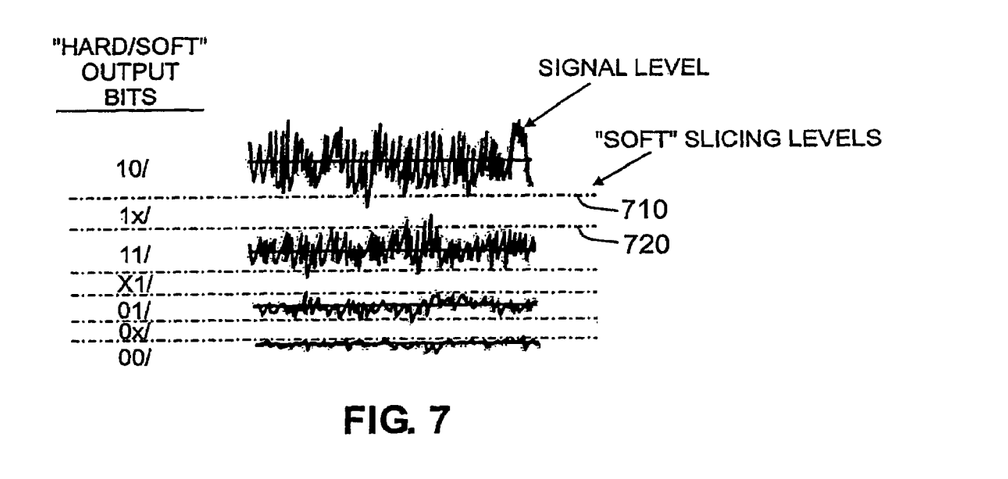
FIG. 7 illustrates a plurality of levels and corresponding soft slicing levels that may be employed in a multiple-level transmission scheme in accordance with the present invention.

As previously indicated, a PAM decision circuit 165 in a receiver 120 employs a novel soft decision decoding technique, shown in FIG. 7, to quantize the received signal and assign a digital value based on the received signal level value in the multiple level scheme. As discussed above, FIG. 6 illustrates an exemplary relationship between signal levels, slicing levels and the corresponding assignment of hard output bits. Thus, signal levels are measured relative to the slicing levels to make a corresponding assignment of the digital value. For example, signal level 635 is generally above the hard slicing level 630 and will thus be assigned a digital value of "10".

The present invention recognizes that in the presence of noise, a given signal level may be closer to a given slicing level 610, 620, 630, thus making the bit assignment more challenging. For example, as shown in FIG. 6, if the signal level 635 is sampled at an instant 665, the signal level 635 is much closer to the slicing level 630 and thus the confidence of the bit assignment is reduced.

According to another aspect of the invention, at least two soft slicing levels are provided between each signal level to define an "uncertainty" region therebetween. The PAM decision circuit 165 in the receiver 120 uses the soft slicing levels to evaluate the reliability of a given bit assignment. Thus, in addition to assigning a digital value (i.e., a hard output code) based on the received signal level (relative to the defined soft slicing levels), the PAM decision circuit 165 also generates a soft bit indicating a "reliability" measure of the output code. When the input signal is close to ideal levels, the output code is very likely to be accurate and the soft bit is set to "1." If, however, the input signal is in an "uncertainty" region, the output code is less reliable and the soft bit is set to "0." If more than two slicing levels are used between two signal levels, it is possible to quantify the reliability with more than one bit. The notation used in FIG. 7 indicates the bit assignment (HH/S) for each signal level and uncertainty region, where HH indicates the two hard bits assigned to the corresponding level and S indicates the soft bit assignment.

When the input signal lies between two soft slicing levels defining an "uncertainty" region, then at least one bit cannot be decided (when using Gray bit-to-symbol mapping only one bit is undefined, since only one bit changes between any two adjacent signal levels). In FIG. 7, the undecided bit in each uncertainty region is indicated by an "x."

The reliability information provided by this soft decision decoding technique can be used by the forward error correction circuit 105 to assign a corresponding digital value. When the soft bit is set to "0," the forward error correction circuit 105 can assign the undecided output bit ("x") based on, for example, (i) the value derived by "hard" slicing levels (which may be established, for example, in the middle of an "uncertainty" region); (ii) randomly to the higher or lower code; (iii) the higher code if the preceding code was lower, and vice-versa (taking into account pattern-dependent noise); or (iv) the higher or lower code based more generally on a sequence of the input data (sequence detection).

It is to be understood that the embodiments and variations shown and described herein are merely illustrative of the principles of this invention and that various modifications may be implemented by those skilled in the art without departing from the scope and spirit of the invention.

I claim:

1. A method for receiving an optical signal over a fiber channel, said method comprising the steps of:
    converting said optical signal to an analog signal level;
    assigning a digital value to said analog signal level based on a plurality of signal levels, wherein at least two slicing levels are provided between at least two adjacent signal levels; and
    assigning a reliability value based on said at least two slicing levels.

2. The method of claim 1, wherein said reliability value has a first binary value if said digital value assignment is reliable.

3. The method of claim 1, wherein said reliability value has a second binary value if said digital value assignment is uncertain.

4. The method of claim 1, wherein more than two slicing levels are used between said at least two adjacent signal levels and said reliability value has more than one bit.

5. The method of claim 1, further comprising the step of assigning a digital value to an uncertain bit based on said reliability value.

6. The method of claim 5, wherein said uncertain bit is assigned based on a value derived by a hard slicing level.

7. The method of claim 6, wherein said hard slicing level is between said two slicing levels.

8. The method of claim 6, wherein said uncertain bit is assigned randomly to a higher or lower code.

9. The method of claim 6, wherein said uncertain bit is assigned to a higher code if the a preceding code was lower, and a lower code if the preceding code was higher.

10. The method of claim 6, wherein said uncertain bit is assigned to a higher or lower code based on a sequence of input data.

11. A system for receiving an optical signal over a fiber channel, said system comprising:
    a photo-detector for converting said optical signal to an analog signal level;
    a quantizer for assigning a digital value to said analog signal level based on a plurality of signal levels, wherein at least two slicing levels are provided between at least two adjacent signal levels; and
    a decision circuit for assigning a reliability value based on said at least two slicing levels.

12. The system of claim 11, wherein said reliability value has a first binary value if said digital value assignment is reliable.

13. The system of claim 11, wherein said reliability value has a second binary value if said digital value assignment is uncertain.

14. The system of claim 11, wherein more than two slicing levels are used between said at least two adjacent signal levels and said reliability value has more than one bit.

15. The system of claim 11, further comprising a forward error correction circuit that assigns a digital value to an uncertain bit based on said reliability value.

16. The system of claim 15, wherein said uncertain bit is assigned based on a value derived by a hard slicing level.

17. The system of claim 16, wherein said hard slicing level is between said two slicing levels.

18. The system of claim 16, wherein said uncertain bit is assigned randomly to a higher or lower code.

19. The system of claim 16, wherein said uncertain bit is assigned to a higher code if a preceding code was lower, and a lower code if the preceding code was higher.

20. The system of claim 16, wherein said uncertain bit is assigned to a higher or lower code based on a sequence of input data.

21. A system for receiving an optical signal over a fiber channel, said system comprising:

a photo-detector to convert said optical signal to an analog signal level;

a memory that stores computer-readable code; and a processor operatively coupled to aid memory, said processor configured to implement said computer-readable code, said computer-readable code configured to:

adjust at least two slicing levels based on said analog signal level, wherein said at least two slicing levels are positioned between at least two adjacent signal levels in a transmission scheme having a plurality of signal levels.

* * * * *

UNITED STATES PATENT AND TRADEMARK OFFICE
CERTIFICATE OF CORRECTION

| | | |
|---|---|---|
| PATENT NO. | : 7,155,134 B2 | Page 1 of 1 |
| APPLICATION NO. | : 10/219904 | |
| DATED | : December 26, 2006 | |
| INVENTOR(S) | : Azadet | |

It is certified that error appears in the above-identified patent and that said Letters Patent is hereby corrected as shown below:

In claim 9, column 6, line 37, after "if" and before "a preceding code" delete "the".

In claim 21, column 8, line 2, after "to" and before "memory" replace "aid" with --said--.

Signed and Sealed this

Seventh Day of October, 2008

JON W. DUDAS
*Director of the United States Patent and Trademark Office*